US008387151B2

(12) United States Patent
Masato

(10) Patent No.: US 8,387,151 B2
(45) Date of Patent: Feb. 26, 2013

(54) CONTENT DATA MANAGING APPARATUS, CONTENT DATA MANAGING METHOD, AND CONTENT DATA MANAGING PROGRAM

(75) Inventor: Tsuyoshi Masato, Kanagawa (JP)

(73) Assignee: Sony Corporation, Tokyo (JP)

( * ) Notice: Subject to any disclaimer, the term of this patent is extended or adjusted under 35 U.S.C. 154(b) by 803 days.

(21) Appl. No.: 12/494,608

(22) Filed: Jun. 30, 2009

(65) Prior Publication Data

US 2010/0011017 A1  Jan. 14, 2010

(30) Foreign Application Priority Data

Jul. 10, 2008  (JP) .............................. P2008-180742

(51) Int. Cl.
*G06F 11/00*  (2006.01)
(52) U.S. Cl. ....................................................... 726/26
(58) Field of Classification Search ..................... 726/26
See application file for complete search history.

(56) References Cited

U.S. PATENT DOCUMENTS

| 4,924,378 | A  | * | 5/1990  | Hershey et al. .................. 726/29 |
| 7,242,851 | B2 | * | 7/2007  | Nagao ............................ 386/253 |
| 7,565,700 | B2 | * | 7/2009  | Bellwood et al. ............... 726/27 |
| 2003/0231334 | A1 | | 12/2003 | Nagai et al. |

FOREIGN PATENT DOCUMENTS

| JP | 11-232725 | 8/1999 |
| JP | 2000-57057 | 2/2000 |
| JP | 2002-216420 | 8/2002 |
| JP | 2002-251819 | 9/2002 |
| JP | 2003-140976 | 5/2003 |
| JP | 2004-007494 | 1/2004 |
| JP | 2004-46555 | 2/2004 |
| JP | 2004-336576 | 11/2004 |
| JP | 2005-311661 | 11/2005 |
| JP | 2006-134089 | 5/2006 |
| WO | WO 2006/008986 | 1/2006 |

* cited by examiner

*Primary Examiner* — Christopher Brown
(74) *Attorney, Agent, or Firm* — Finnegan Henderson Farabow Garrett & Dunner LLP

(57) ABSTRACT

A content data managing apparatus includes: timing means for measuring time, not allowed to correct measure time by an operator; content-data storing means for storing data of content and recording time of the content measured by the timing means; content recording means for recording the content to cause the content-data storing means to store data of the recorded content; recording-time recording means for causing the content-data storing means to store, in association with the content, the recording time when the recording of the content is executed; storage-period extracting means for extracting data concerning a storage period for the content, from the data of the content; storage-period-end-time calculating means for calculating storage period end time for the content from the storage period and data of the recording time; and content-data deleting means for deleting the content when present time measured by the timing means is past the storage period end time.

10 Claims, 3 Drawing Sheets

CONTENT DATA MANAGING APPARATUS, CONTENT DATA MANAGING METHOD, AND CONTENT DATA MANAGING PROGRAM

BACKGROUND OF THE INVENTION

1. Field of the Invention

The present invention relates to a content data managing apparatus, a content data managing method, and content data managing program for managing a storage period of recorded content to thereby prevent illegal use of the content.

2. Description of the Related Art

There is known a recording apparatus that records a data stream conforming to the DTCP-IP standard (Digital Transmission Content Protection over Internet Protocol) (see JP-A-2004-007494).

SUMMARY OF THE INVENTION

In such a recording apparatus, it is prohibited to upload the data stream conforming to the DTCP-IP standard (Digital Transmission Content Protection over Internet Protocol) onto the network. However, copying for a private use is not restricted.

In recent years, according to a demand for appropriate protection for copyright, content with time limit is delivered via a communication network. In the recording apparatus disclosed in JP-A-2004-007494, since copying for a private use is not restricted, it is difficult to manage a storage time limit of such content with storage time limit using the recording apparatus.

When the storage time limit of such content with storage time limit is managed by using a general recording apparatus, it is likely that the storage time limit of the content is extended when time of a clock incorporated in the recording apparatus is changed according to the operation by an operator. For example, when there is content recorded at 0 a.m., Jan. 1, XXXX and defined that a storage period is 24 hours, if time of the clock is changed to 0 a.m., Jan. 1, XXXX by the operator at 11:55 p.m., Jan. 1, XXXX, it is likely that the content can be used exceeding the storage period for the content-set, in advance.

According to the inventor's study concerning appropriate protection of copyright, there is an increasing demand in the industry for a content data managing apparatus, a content data managing method, and a content data managing program that can perform appropriate protection of copyright by preventing illegal use of a storage permission period for recorded content.

Therefore, it is desirable to provide a content data managing apparatus, a content data managing method, and a content data managing program that enables a user to perform appropriate protection of copyright by preventing illegal use of a storage permission period for recorded content.

The gist of the present invention is to attain an effect peculiar to the present invention that illegal use of a content storage period is prevented by using a configuration for "deleting, when present time measured by timing means not allowed to correct time measured according to the operation by an operator is past storage period end time for content calculated from the extracted storage period for the content, and data of recording time of the content, data of the content".

Specifically, the gist of the present invention explained above is realized by taking measures explained below.

According to an embodiment of the present invention, there is provided a content data managing apparatus including; first timing means for measuring time, the first timing means being not allowed to correct time measured according to the operation by an operator; content-data storing means for storing data of content and recording time of the content measured by the first timing means; content recording means for recording the content to thereby cause the content-data storing means to store data of the recorded content; first recording-time recording means for causing the content-data storing means to store, in association with the content, the recording time when the recording of the content is executed by the content recording means, the recording time being measured by the first timing means; storage-period extracting means for extracting data concerning a storage period for the content from the data of the content stored in the content-data storing means; storage-period-end-time calculating means for calculating storage period end time for the content from the storage period for the content extracted by the storage-period extracting means and data of the recording time of the content; and content-data deleting means for deleting, when present time measured by the first timing means is past the storage period end time for the content calculated by the storage-period-end-time calculating means, the content from the content-data storing means.

Consequently, when the present time measured by the first timing means not allowed to correct time measured according to the operation by the operator is past the storage period end time for the content calculated from the extracted storage period for the content and the data of the recording time of the content, the data of the content is deleted. This makes it possible to prevent illegal use of the content storage period.

According to another embodiment of the present invention, there is provided a content data managing method including the steps of: recording content to thereby cause content-data storing means for storing data of content and recording time of the content measured by timing means to store data of the recorded content; causing the content-data storing means to store, in association with the content, the recording time when the recording of the content is executed, the recording time being measured by timing means not allowed to correct time measured according to the operation by an operator; extracting data concerning a storage period for the content from the data of the content stored in the content-data storing means; calculating storage period end time for the content from the extracted storage period for the content and data of the recording time of the content; and deleting, when present time measured by the timing means is past the calculated storage period end time for the content, the content from the content-data storing means.

Consequently, when the present time measured by the timing means not allowed to correct time measured according to the operation by the operator is past the storage period end time for the content calculated from the extracted storage period for the content and the data of the recording time of the content, the data of the content is deleted. This mates it possible to prevent illegal use of the content storage period.

According to still another embodiment of the present invention, there is provided a content data managing program installed in a computer of a content data managing apparatus that manages content, the content data managing program causing the computer of the content data managing apparatus to execute: a content recording procedure for recording content to thereby cause content-data storing means for storing data of content and recording time of the content measured by timing means, which is not allowed to correct time, to store data of the recorded content; a first recording-time recording procedure for causing the content-data storing means to store, in association with the content, the recording time when the recording of the content is executed in the content recording procedure, the recording time being measured by timing means not allowed to correct time measured according to the operation by an operator; a storage-period extracting procedure for extracting data concerning a storage period for the content from the data of the content stored in the content-data storing means; a storage-period-end-time calculating procedure for calculating storage period end time for the content from the storage period for the content extracted in the storage-period extracting procedure and data of the recording time of the content; and a content-data deleting procedure for deleting, when present time measured by the timing means is past the storage period end time for the content calculated in the storage-period-end-time calculating procedure, the content from the content-data storing means.

Consequently, when the present time measured by the timing means not allowed to correct time measured according to the operation by the operator is past the storage period end time for the content calculated from the extracted storage period for the content and the data of the recording time of the content, the data of the content is deleted. This makes it possible to prevent illegal use of the content, storage period.

According to the embodiments, when the present, time measured by the timing means not allowed to correct time measured according to the operation by the operator is past the storage period end time for the content calculated from the extracted storage period for the content and the data of the recording time of the content, the data of the content is deleted. This makes it possible to prevent illegal use of the content storage period.

DESCRIPTION OF THE PREFERRED EMBODIMENTS

Embodiments of the present invention are explained in detail below with reference to the accompanying drawings.

Figure 1:
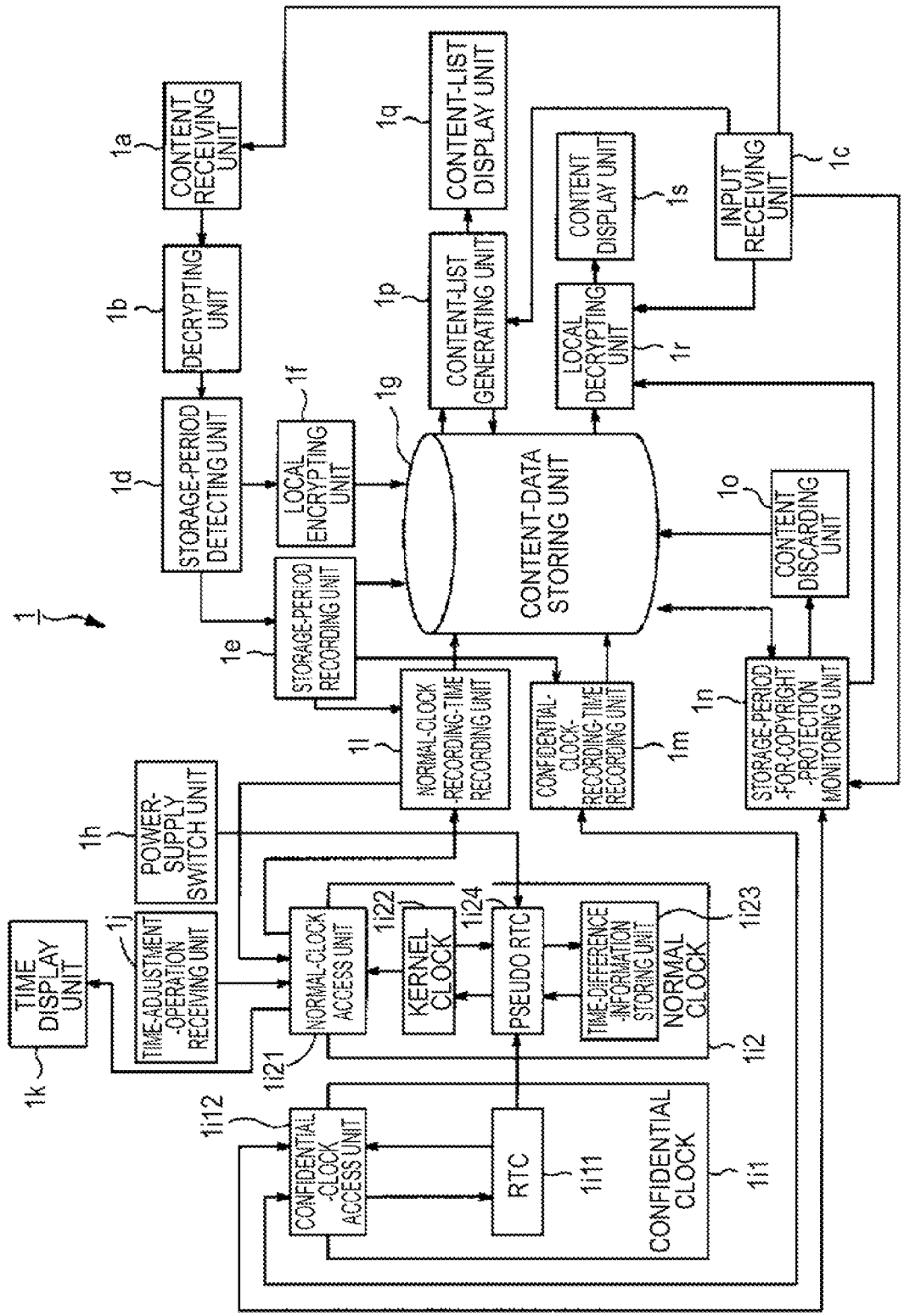
FIG. 1 is a block diagram of an overall configuration of a content data managing apparatus 1 according to an embodiment of the present invention.

FIG. 1 is a block diagram of an overall configuration of a content data managing apparatus 1 according to an embodiment of the present invention.

The content data managing apparatus 1 according to this embodiment is an apparatus that manages two kinds of time information, i.e., user time that a user as an operator is allowed to correct with one RTC (Real Time Clock) and secure time that the user is not allowed to correct, to thereby prevent illegal use of a content storage period.

In other words, the content data managing apparatus 1 according to this embodiment records a moving image including content, for example, MPEG-2 TS conforming to the DTCP-IP standard (Digital Transmission Content Protection over Internet Protocol) received via a communication network or the like, calculates content storage end time of the recording from data of RETENTION BIT included in a PMT (Program MapTable) in the recorded moving image and indicating a storage permission period from the time when the recorded moving image as the content is recorded and data of recording time that is stored in association with the recorded content, and not allowed to foe changed according to the operation by the operator, and deletes, when preset time allowed to be changed according to the operation by the operator is past the calculated content storage end time, the content to thereby prevent illegal use of a content storage period. In this specification, "RETENTION BIT" means data indicating information concerning whether it is possible to copy, as an exception, data of content originally transmitted in an uncopyable state and information concerning a period in which the data of the content can be copied, "RETENTION BIT" includes data of "Retention_Move_mode" and "Retention_State" specified by DTCP Specification Volume Revision 1.51 (informational version).

The content data managing apparatus 1 according to this embodiment includes, as shown in FIG. 1, a content receiving unit 1a, a decryption processing unit 1b, an input receiving unit 1c, a storage-period detecting unit 1d, a storage-period recording unit 1e, a local-encryption processing unit 1f, a content-data storing unit 1g, a power-supply switch unit 1h, a secure clock unit 1i, a time-adjustment-operation receiving unit 1j, a time display unit 1k, a normal-clock-recording-time recording unit 1l, a confidential-clock-recording-time recording unit 1m, a storage-period-for-copy right-protection monitoring unit 1n, a content discarding unit 1o, a content-list generating unit 1p, a content-list display unit 1q, a local-decryption processing unit 1r, and a content display unit 1s.

The secure clock unit 1i according to this embodiment includes a confidential clock unit 1i1 and a normal clock unit 1i2.

Further, the confidential clock unit 1i1 includes an RTC unit 1i11 and a confidential-clock access unit 1i12.

The normal clock unit 1i2 includes a normal-clock access unit 1i21, a kernel clock unit 1i22, a time-difference-information storing unit 1i23, and a pseudo RTC unit 1i24.

The content data managing apparatus 1 according to this embodiment is realized by a publicly-known computer in which a content data managing program is installed via a recording medium or a communication network.

The units configuring the content data managing apparatus 1 according to this embodiment may include software or hardware or a combination of the software and the hardware.

The content receiving unit 1a has a function of, when a recording request for a moving image is received from the input receiving unit 1c, receiving, via a communication network, data of a stream of a moving image as content transmitted from a not-shown broadcast data server apparatus included in a not-shown broadcasting station using a network protocol such as HTTP (HyperText Transfer Protocol) or RTF (Transport Protocol for Real-Time applications) and a function of outputting the received data of the stream of the moving image to the decryption processing unit 1b.

The decryption processing unit 1b applies decryption processing to the data of the stream of the moving image received by the content receiving unit 1a and outputs the data of the stream of the moving image subjected to the decryption processing to the storage-period detecting unit 1d.

The input receiving unit 1c has a function of receiving inputs of a content recording request for recording a moving image as content input according to the operation by the operator, a content reproduction request for reproducing the recorded content, and a content list display request for displaying the recorded and reproducible content, a function of outputting a transfer request for the input content to the content receiving unit 1a, a function of outputting a reproduction request for the input content to the local decryption processing unit 1r and the storage-period-for-copyright-protection monitoring unit 1n, and a function of outputting the content list display request to the content-list generating unit 1p.

The storage-period detecting unit 1d has a function of receiving the data of the stream of the moving image received from the decryption processing unit 1b and detecting data of RETENTION BIT indicating a storage permission period from the time of recording of the recorded moving image as the content included in a PMT of MPEG-2 TS forming the received stream, a function of outputting the detected data of RETENTION BIT indicating the storage permission period from the time of recording of the recorded moving image as the content to the storage-period recording unit 1e, and a function of outputting the data of MPEG-2 TS forming the stream received from the decryption processing unit 1b to the local-encryption processing unit 1f.

The storage-period recording unit 1e has a function of causing the content-data storing unit 1g to store, in association with the data of the moving image, the data of RETENTION BIT indicating the storage permission period from the time of recording of the recorded moving image as the content detected by the storage-period detecting unit 1d, a function of outputting a first recording time recording command for recording, as data of recording time when the content is recorded, time measured by the kernel clock unit 1i22 to the normal-clock-recording-time recording unit 1l, and a function of outputting a second recording time recording command for recording, as data of the recording time when the content is recorded, time measured by the RTC unit 1i11 to the confidential-clock-recording-time recording unit 1m.

The local-encryption processing unit 1f has a function of encrypting the data of MPEG-2 TS forming the stream received from the storage-period detecting unit 1d and causing the content-data storing unit 1g to store encrypted data obtained as a result of encrypting the data.

The data of MPEG-2 TS forming the stream of the moving image, the storage permission period for the moving image, the recording time of the moving image measured by the clock allowed to be changed according to the operation by the operator, attribute information of the moving image, and the recording time of the moving image measured by the clock not allowed to be changed according to the operation by the operator are stored in the content-data storing unit 1g in an encrypted state at least in association with one another.

The power-supply switch unit 1h is a mechanical switch that can switch ON and OFF states according to the operation by the operator. The power-supply switch unit 1h has a function of outputting, when switched to the ON state according to the operation by the operator, a power-on signal indicating that a power supply for a main body of the content managing apparatus 1 is turned on to the normal clock unit 1i2.

The RTC unit 1i11 is a clock that measures time even in a state in which a power supply is typically backed up by a not-shown battery power supply, i.e., even in a state in which the power supply switch unit 1h is switched to the OFF state and is a clock not allowed to change time measured according to the operation by the operator.

The confidential-clock access unit 1i12 has a function of reading out, when a recording request is received front the input receiving unit 1c, data of time measured by the RTC unit 1i11 and outputting the read-out data of the time to the confidential-clock-recording-time recording unit 1m, a function of reading out, when a transmission request for the data of the time measured by the RTC unit 1i11 is received from the confidential-clock-recording-time recording unit 1m, the data of the time measured by the RTC unit 1i11 from the RTC unit 1i11 and outputting the read-out data of the time to the confidential-clock-recording-time recording unit 1m, and a function of reading out, when a transmission request for the data of the time measured by the RTC unit 1i11 is received from the storage-period-for-copyright-protection monitoring unit 1n, the data of the time measured by the RTC unit 1i11 and outputting the read-out data of the time to the storage-period-for-copyright-protection monitoring unit 1n.

The time-adjustment-operation receiving unit 1j has a function of receiving operation concerning adjustment of time performed according to the operation by the operator and a function of outputting data of the time after the adjustment performed according to the operation by the operator to the normal-clock access unit 1i21.

The normal-clock access unit 1i21 has a function of receiving the data of the time after the time adjustment performed according to the operation by the operator from the time-adjustment-operation receiving unit 1j and outputting the received data of the time after the time adjustment to the kernel clock unit 1i22 and a function of reading out, when a transmission request for data of time measured by the kernel clock unit 1i22 is received from the normal-clock-recording-time recording unit 1l, the data of the time measured by the kernel clock 1i22 from the kernel clock unit 1i22 and outputting the read-out data of the time to the normal-clock-recording-time recording unit 1l.

The kernel clock unit 1i22 has a function of performing timing from set time after the power-supply switch unit 1h is switched to the ON state or according to the operation by the operator.

Data concerning a time difference calculated from data of time measured by the RTC unit 1i11 at the last system end time and time measured by the pseudo RTC unit 1i24 is stored in the time-difference-information storing unit 1i23.

The pseudo RTC unit 1i24 has a function of reading out, when the power-supply switch unit 1h is switched to the ON state, i.e., a power-on signal indicating that the power supply switch is switched to the ON state is received from the power-supply switch unit 1h, after reading the data of the time measured by the RTC unit 1i11 from the RTC unit 1i11 and interpolating time advancing during stop, data concerning a time difference calculated from the data of the time measured by the RTC unit 1i11 at the last system end time stored in the time-difference-information storing unit 1i23 and the time measured by the pseudo RTC unit 1i24 and calculating set time set by the operator from the data of the time measured by the RTC unit 1i11 read out from the RTC unit 1i11 and the data concerning the time difference calculated from the data of the time measured by the RTC unit 1i11 at the last system end time stored in the time-difference-information storing unit 1i23 and the time measured by the pseudo RTC unit 1i24, a function of writing the calculated data of the set time in the kernel clock unit 1i22, and a function of calculating, when the power-supply switch unit 1h is switched to the OFF state, i.e., when the power-on signal is not detected from the power-supply switch unit 1h, a difference between the data of the time measured by the kernel clock unit 1i22 and the data of the time measured by the RTC unit 1i11 and causing the time-difference-information storing unit 1i23 to store data of the calculated difference.

The time display unit 1k has a function of displaying the data of the time measured by the kernel clock unit 1i22.

The normal-clock-recording-time recording unit 1l has a function of outputting to the normal-clock access unit 1i21, when the first recording time recording command output from the storage-period recording unit 1e is received, a time data transmission request for transmitting the data of the time measured by the kernel clock unit 1i22 and a function of receiving the data of the time measured by the kernel clock unit 1i22 output from the normal-clock access unit 1i21 and causing the content-data storing unit 1g to store the received data of the time measured by the kernel clock unit 1i22 as recording time in association with the content.

The confidential-clock-recording-time recording unit 1m has a function of outputting to the confidential-clock access unit 1i12, when the second recording time recording command output from the storage-period recording unit 1e is received, a time data transmission request for transmitting the data of the time measured by the RTC unit 1i11 and a function of receiving the data of the time measured by the RTC unit 1i11 output from the confidential-clock access unit 1i12 and causing the content-data storing unit 1g to store the received data of the time measured by the RTC unit 1i11 as recording time in association with the content.

The storage-period-for-copyright-protection monitoring unit 1n has a function of outputting, when a content reproduction request is received from the input receiving unit 1c, a transmission request for time measured by the RTC unit 1i11 to the confidential-clock access unit 1i12, a function of reading out, when data of present time measured by the RTC unit 1i11 output from the confidential-clock access unit 1i12 is received, data of content, reproduction of which is requested by the operator, from the content-data storing unit 1g, calculating storage period end time for the content from data of recording time of the read-out content and data of RETENTION BIT indicating a storage permission period from the time of recording of the recorded content, determining, according to the calculated storage period end time for the content and the data of the present time measured by the RTC unit 1i11 received from the confidential-clock access unit 1i12, whether the data of the present time measured by the RTC unit 1i11 received from the confidential-clock access unit 1i12 is past the calculated storage period end time for the content, a function of outputting, when the data of the present time measured by the RTC unit 1i11 received from the confidential-clock access unit 1i12 of the content, reproduction of which is requested by the operator, is past the calculated storage period end time for the content as a result of the determination, a set of storage period end content presence information indicating that the content, the data of the present time measured by the ETC unit 1i11 of which is past the calculated storage period end time for the content, is present and information concerning the content to the content discarding unit 1o, a function of outputting, when the data of the present time measured by the RTC unit 1i11 received from the confidential-clock access unit 1i12 is not past the calculated storage period end time for the content as a result of the determination, content reproduction permission notification indicating that reproduction of the content requested to be reproduced is permitted to the local decrypting unit 1r, and a function of outputting storage period end content absence information indicating that content, the data of the present time measured by the RTC unit 1i11 of which is past, the calculated, storage period end time for the content, is not present to the content, discarding unit 1o.

The content discarding unit 1o has a function of deleting, when the set of the storage period end content, presence information indicating that the data of the present time measured by the RTC unit 1i11 of the content, reproduction of which is requested by the operator, is past the calculated storage period end time for the content is present and the information concerning the content is received from the storage-period-for-copyright-protection monitoring unit 1n, data of the content, the data of the present time measured by the RTC unit 1i11 of which is past the calculated storage period end time for the content, and a function of finishing the execution processing when the storage period end content absence information indicating that content, the data of the present time measured by the RTC unit 1i11 of which is past the calculated storage period end time for the content, is not present is received from the storage-period-for-copyright-protection monitoring unit 1n.

The content-list generating unit 1p has a function of reading out, when the content list display request is received from the input receiving unit 1c, data concerning all contents stored in the content-data storing unit 1g from the content-data storing unit 1g, generating a content list including attribute information of the read-out contents, and causing the content-list display unit 1q to display data of the generated content list.

The content-list display unit 1q has a not-shown display screen for displaying the content list and displays the content list including the attribute information of the contents, for example, titles of the contents, recording times, and lengths of the contents.

When the reproduction permission notification for the content indicating that the reproduction of the content requested to be reproduced is received from the storage-period-for-copyright-protection monitoring unit 1n after the reproduction request for the moving image is received from the input receiving unit 1c, the local decrypting unit 1r reads out data of the content from the content-data storing unit 1g, decrypts the read-out content, and causes the content display unit 1s to display the content.

The content display unit 1s has a not-shown display screen for displaying content and displays the content, reproduction of which is requested by the operator.

The execution processing executed by the content data managing apparatus 1 configured as explained above is explained with reference to the drawings.

Figure 2:
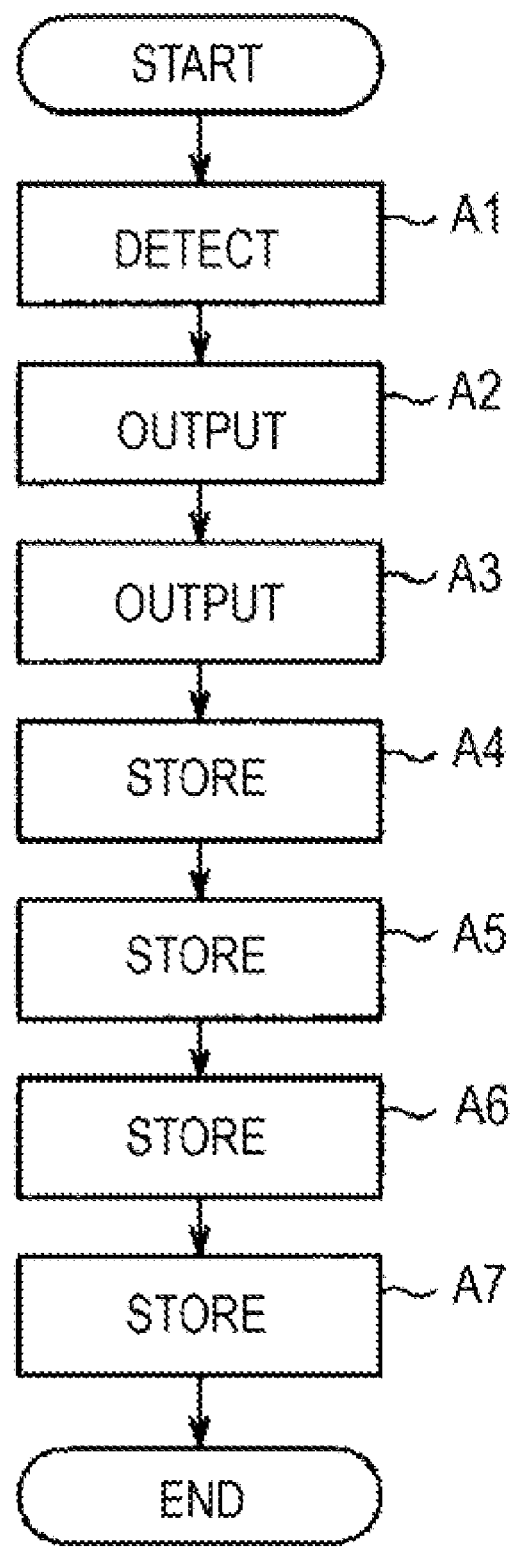
FIG. 2 is a flowchart for explaining recording processing executed by the content data managing apparatus 1 according to the embodiment.
Figure 3:
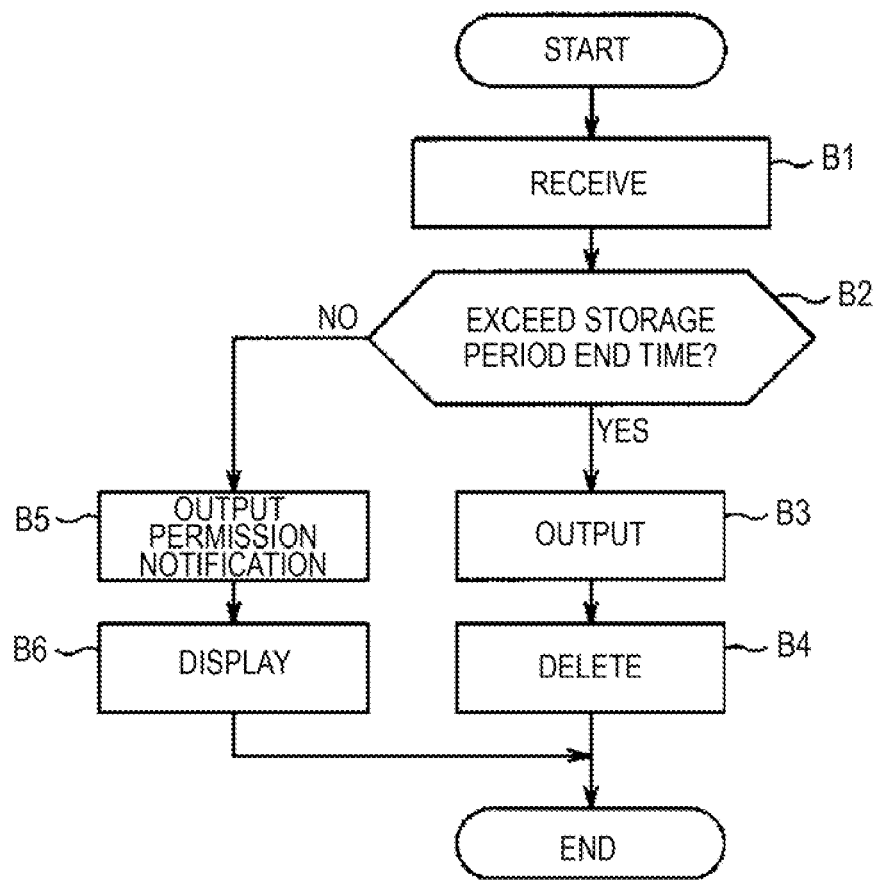
FIG. 3 is a flowchart for explaining content reproduction processing executed by the content data managing apparatus 1 according to the embodiment.
Figure 4:
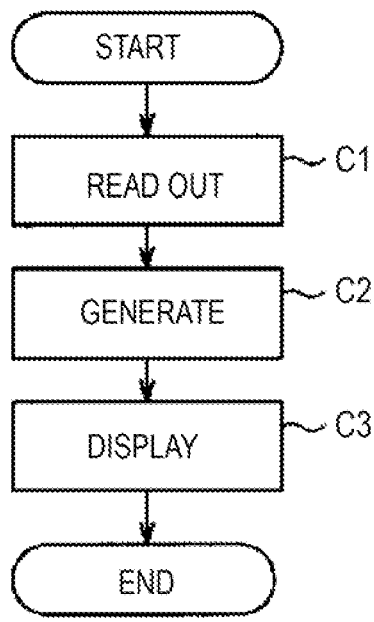
FIG. 4 is a flowchart for explaining content list display processing executed by the content data managing apparatus 1 according to the embodiment.

FIGS. 2 to 4 are flowcharts for explaining the execution processing executed by the content data managing apparatus 1 according to this embodiment.

The content data managing apparatus 1 according to this embodiment executes recording processing, content reproduction processing, and content list display processing.

The respective kinds of processing are explained more in detail below.

Recording Processing: STA

FIG. 2 is a flowchart for explaining the recording processing executed by the content data managing apparatus 1 according to this embodiment.

First, a not-shown recording button for recording content provided in the input receiving unit 1c of the content data managing apparatus 1 according to this embodiment is operated by the operator. The storage-period detecting unit 1d receives data of a stream of a moving image through the content receiving unit 1a and the decryption processing unit 1b and detects data of RETENTION BIT indicating a storage permission period from the time of recording of the moving image as the recorded content included in a PMT in MPEG-2 TS forming the received stream (A1).

Subsequently, the storage-period detecting unit 1d outputs the detected data of RETENTION BIT indicating the storage permission period from the time of recording of the moving image as the recorded content to the storage-period recording unit 1e (A2).

The storage-period detecting unit 1d outputs the data of MPEG-2 TS forming the stream received from the decryption processing unit 1b to the local-encryption processing unit 1f (A3).

The local-encryption processing unit 1f encrypts the data of MPEG-2 TS forming the stream received from the storage-period detecting unit 1d and causes the content-data storing unit 1g to store encrypted data obtained as a result of encrypting the data (A4).

The storage-period recording unit 1e causes the content-data storing unit 1g to store, in association with the data of the moving image, the data of RETENTION BIT indicating the storage permission period from the time of recording of the moving image as the recorded content detected by the storage-period detecting unit 1d (A5).

The normal-clock-recording-time recording unit 1l receives a first recording time recording command output from the storage-period recording unit 1e. The normal-clock-recording-time recording unit 1l outputs, to the normal-clock access unit 1i21, a time data transmission request for transmitting data of time measured by the kernel clock unit 1i22. The normal-clock-recording-time recording unit 1l receives the data of the time measured by the kernel clock unit 1i22 output from the normal-clock access unit 1i21. The normal-clock-recording-time recording unit 1l causes the content-data storing unit 1g to store the received data of the time measured by the kernel clock unit 1i22 as recording time in association with the content (A6).

The confidential-clock-recording-time recording unit 1m receives a second recording time recording command output from the storage-period recording unit 1e. The confidential-clock-recording-time recording unit 1m outputs, to the confidential-clock access unit 1i12, a time data transmission request for transmitting data of time measured by the RTC unit 1i11. The confidential-clock-recording-time recording unit 1m receives the data of the time measured by the RTC unit 1i11 output from the confidential-clock access unit 1i12. The confidential-clock-recording-time recording unit 1m causes the content-data storing unit 1g to store the received data of the time measured by the RTC unit 1i11 as recording time in association with the content (A7).

According to the series of processing, the content data managing apparatus 1 according to this embodiment finishes the recording processing under execution.

Content Reproduction Processing: STB

FIG. 3 is a flowchart for explaining the content reproduction processing executed by the content data managing apparatus 1 according to this embodiment.

First, a not-shown reproduction button for reproducing content provided in the input receiving unit 1c of the content data managing apparatus 1 according to this embodiment is operated by the operator. After receiving a content reproduction request from the input receiving unit 1c, the storage-period-for-copyright-protection monitoring unit 1n outputs a transmission request for time measured by the RTC unit 1i11 to the confidential-clock access unit 1i12. The storage-period-for-copyright-protection monitoring unit 1n receives data of present time measured by the RTC unit 1i11 output from the confidential-clock access unit 1i12 (B1).

Subsequently, the storage-period-for-copyright-protection monitoring unit 1n reads out data of content, reproduction of which is requested by the operator, from the content-data storing unit 1g. The storage-period-for-copyright-protection monitoring unit 1n calculates storage period end time for the content from data of recording time of the read-out content and data of RETENTION BIT indicating a storage permission period from the time of recording of the recorded content. The storage-period-for-copyright-protection monitoring unit 1n determines, according to the calculated storage period end time for the content and data, of present time measured by the RTC unit 1i11 received from the confidential-clock access unit 1i12, whether the data of the present time measured by the RTC unit 1i11 received from the confidential-clock access unit 1i12 is past the calculated storage period end time of the content (B2).

When the data of the present time measured by the RTC unit 1i11 received from the confidential-clock access unit 1i12 is past the calculated storage period end time of the content as a result of the determination in step B2 (B2: Yes), the storage-period-for-copyright-protection monitoring unit 1n outputs a set of storage period end content presence information indicating that the content, the data of the present time measured by the RTC unit 1i11 of which is past the calculated storage period end time for the content, is present and information concerning the content to the content discarding unit 1o (B3).

In step B4, the content discarding unit 1o receives the set of the storage period end content, presence information, indicating that the data of the present, time measured by the RTC unit 1i11 of the content is past the calculated storage period end time for the content is present and the information concerning the content from the storage-period-for-copyright-protection monitoring unit 1n. The content discarding unit 1o reads out data of the content, the data of the present time measured by the RTC unit 1i11 of which is past the calculated storage period end time for the content, from the content-data storing unit 1g and then deletes the read-out data of the content.

On the other hand, when the data of the present time measured by the RTC unit 1i11 received from the confidential-clock access unit 1i12 is not past the calculated storage period end time of the content as a result of the determination (B2: No), the storage-period-for-copyright-protection monitoring unit 1n outputs reproduction permission notification indicating that reproduction of the content requested to be reproduced is permitted to the local decrypting unit 1r (B5).

In the content data managing apparatus 1 according to this embodiment, the storage-period-for-copyright-protection monitoring unit 1n may have a function of outputting, when a content reproduction request is received from the input receiving unit 1c, a transmission request for time measured by the RTC unit 1i11 to the confidential-clock access unit 1i12, a function of calculating, when data of present time measured by the RTC unit 1i11 output from the confidential-clock access unit 1i12 is received, storage period end time for the content concerning all contents stored in the content-data storing unit 1g from data of recording time of the content read out from the content-data storing unit 1g and data of RETENTION BIT indicating a storage permission period from the time of recording of recorded content and determining, according to the calculated storage period end time for the content and the data of the present time measured by the RTC unit 1i11 received from the confidential-clock access unit 1i12, whether content, the data of the present time measured by the RTC unit 1i11 of which received from the confidential-clock access unit 1i12 is past the calculated storage period end time for the content, is present, and a function of outputting, when the content, the data of the present time measured by the RTC unit 1i11 of which received from the confidential-clock access unit 1i12 is past the calculated storage period end time for the content, is present as a result of the determination, a set of storage period end content presence information indicating that the content, the data of the present time measured by the RTC unit 1i11 of which is past the calculated storage period end time for the content, is present and information concerning the content to the content discarding unit 1o and outputting, when the content, the data of the present time measured by the RTC unit 1i11 of which received from the confidential-clock access unit 1*i*12 is past the calculated storage period end time for the content, is not present as a result of the determination, storage period end content absence information indicating that content, the data of the present time measured by the RTC unit 1*i*11 of which is past the calculated storage period end time for the content, is not present to the content discarding unit 1*o*.

In step B6, when the reproduction permission notification for the content indicating that the reproduction of the content requested to be reproduced is permitted is received from the storage-period-for-copyright-protection monitoring unit. In after the reproduction request for the moving image is received from the input receiving unit 1*c*, the local decrypting unit 1*r* reads out the data of the content, reproduction of which is requested by the operator, from the content-data storing unit 1*g*, decrypts the read-out content, and causes the content display unit 1*s* to display the content.

According to the series of processing, the content data managing apparatus 1 according to this embodiment finishes the reproduction processing under execution.

In the content data managing apparatus 1 according to this embodiment, the storage-period-for-copyright protection monitoring unit 1*n* calculates, concerning only the content, reproduction of which is requested by the operator, the storage period end time for the content from the data of the recording time of the content read out from the content-data storing unit 1*g* and the data of RETENTION BIT indicating the storage permission period from the time of recording of the recorded content and executes the determination processing for determining, according to the calculated storage period end time for the content and the data of the present time measured by the RTC unit 1*i*11 received from the confidential-clock access unit 1*i*12, whether the data of the present time measured by the RTC unit 1*i*11 received from the confidential-clock access unit 1*i*12 is past the calculated storage period end time of the content. However, the present invention is not limited to this. It goes without saying that, irrespective of the content reproduction processing, at a substantial fixed time interval set in advance or every time the power-supply switch unit 1*h* is switched to the OK state according to the operation by the operator, the storage-period-for-copyright protection monitoring unit 1*n* may calculate, concerning all the contents stored in the content-data storing unit 1*g*, the storage period end time for the content from, the data of the recording time of the content read out from the content-data storing unit 1*g* and the data of RETENTION BIT indicating the storage permission period from the time of recording of the recorded content and execute the determination processing for determining, according to the calculated storage period end time for the content and the data, of the present time measured by the RTC unit 1*i*11 received from the confidential-clock access unit 1*i*12, whether content, the data of the present time measured by the RTC unit 1*i*11 of which received from the confidential-clock access unit 1*i*12 is past, the calculated storage period end time of the content, is present.

Content List Display Processing: STC

FIG. 4 is a flowchart for explaining the content list display processing executed by the content data managing apparatus 1 according to this embodiment.

First, a not-shown list generation button for generating a content list provided in the input receiving unit 1*c* of the content data managing apparatus 1 according to this embodiment is operated by the operator. The content-list generating unit 1*p* receives a content list display request from the input receiving unit 1*c*. The content-list generating unit 1*p* reads out the data concerning ail the contents stored in the content-data storing unit 1*g* from the content-data storing unit 1*g* (C1).

Subsequently, the content-list generating unit 1*p* generates a content list including attribute information of the read-out contents (C2).

The content-list generating unit 1*p* causes the content-list display unit 1*q* to display data of the generated content list (C3).

According to the series of processing, the content data managing apparatus 1 according to this embodiment finishes the content list display processing under execution.

As explained above, according to this embodiment, when the present time measured by the RTC unit 1*i*11 not allowed to correct time measured according to the operation by the operator is past the storage period end time for the content calculated from the storage period for the content and the data of the recording time of the content stored in the content-data storing unit 1*g* in association with the content, the data of the content, the present time measured by the RTC unit 1*i*111 of which is past the calculated storage period end time of the content, is deleted. This makes it possible to prevent illegal use of the content storage period.

The present invention is not limited to the embodiment. At an implementation stage, various modifications are possible without departing from the spirit of the present invention. Further, inventions at various stages are included in the embodiment. Various inventions can be generated according to appropriate combinations in the disclosed plural elements. For example, when an invention is generated by omitting several elements from ail the elements disclosed in the embodiment, at a stage when the generated invention is carried out, the omitted elements are supplemented by a well-known conventional technique.

Besides, the present invention can be variously modified and carried out without departing from the spirit of the present invention.

The present application contains subject matter related to that disclosed in Japanese Priority Patent-Application JP 2008-180742 filed in the Japan Patent Office on Jul. 10, 2008, the entire contents of which is hereby incorporated by reference.

What is claimed is:

1. A content data managing apparatus comprising:
   a processor; and
   a memory coupled to the processor, the memory including a plurality of sections including instructions configured to be executed by the processor, the memory comprising:
   a first timing section including instructions for measuring time, the first timing section being not allowed to correct time measured according to an operation by an operator;
   a content-data storing section including instructions for storing data of content and recording time of the content measured by the first timing section;
   a content recording section including instructions for recording the content to thereby cause the content-data storing section to store data of the recorded content;
   a first recording-time recording section including instructions for causing the content-data storing section to store, in association with the content, the recording time when the recording of the content is executed by the content recording section, the recording time being measured by the first timing section;

a storage-period extracting section for extracting data concerning a storage period for the content from the data of the content stored in the content-data storing section;

a storage-period-end-time calculating section including instructions for calculating storage period end time for the content from the storage period for the content extracted by the storage-period extracting section and data of the recording time of the content;

a content-data deleting section including instructions for deleting, when present time measured by the first timing section is past the storage period end time for the content calculated by the storage-period-end-time calculating section, the content from the content-data storing section;

a second timing section including instructions for measuring time interpolated on the basis of the time measured by the first timing section and a difference between the time measured by the first timing section and a time set according to the operation by the operator, the second timing section being allowed to correct the time measured according to the operation by the operator;

a recording-time storing section including instructions for storing recording time when recording of the content is executed by the content recording section;

a second recording-time recording section including instructions for causing the recording-time storing section to store the recording time when the recording of the content is executed by the content recording section, the recording time being measured by the second timing section;

a content-list generating section including instructions for generating, when a display request for causing display means to display recorded content stored in the content-data storing section is received from the operator, a content list including data of all recorded contents and data of recording times of the contents from data of all contents read out from the content-data storing section and data of the recording time stored in recording-time storing section; and a display control section including instructions for causing the display means to display the content list generated by the content-list generating section.

2. A content data managing apparatus according to claim 1, wherein the storage-period extracting section detects data of RETENTION BIT from data of a PMT included in MPEG2-TS stored in the content-data storing section and extracts data of a storage period of the content from the detected data of RETENTION BIT.

3. A content data managing apparatus according to claim 1, wherein the first timing section is capable of measuring time when a power supply to the apparatus is in an OFF state.

4. A content data managing apparatus according to claim 1, wherein the content includes a recorded moving image.

5. A computer-implemented content data managing method comprising:

recording, by a processor, content to thereby cause content-data storing means for storing data of content and recording time of the content measured by timing means to store data of the recorded content;

causing, by the processor, the content-data storing means to store, in association with the content, the recording time when the recording of the content is executed, the recording time being measured by timing means not allowed to correct time measured according to an operation by an operator;

detecting, by the processor, data of RETENTION BIT from data of a PMT included in MPEG2-TS stored in the content-data storing means;

extracting, by the processor, data concerning a storage period for the content from the data of the content stored in the content-data storing means, the data of the storage period for the content being extracted from the detected data of RETENTION BIT;

calculating, by the processor, storage period end time for the content from the extracted storage period for the content and data of the recording time of the content; and deleting, by the processor, when present time measured by the timing means is past the calculated storage period end time for the content, the content from the content-data storing means.

6. A non-transitory computer-readable storage medium encoded with instructions which, when executed on a computer processor, perform procedures, the procedures comprising:

a content recording procedure for recording content to thereby cause content-data storing means for storing data of content and recording time of the content measured by a first timing means, which is not allowed to correct time, to store data of the recorded content;

a first recording-time recording procedure for causing the content-data storing means to store, in association with the content, the recording time when the recording of the content, is executed in the content recording procedure, the recording time being measured by the first timing means not allowed to correct time measured according to an operation by an operator;

a storage-period extracting procedure for extracting data concerning a storage period for the content from the data of the content stored in the content-data storing means;

a storage-period-end-time calculating procedure for calculating storage period end time for the content from the storage period for the content extracted in the storage-period extracting procedure and data of the recording time of the content;

a content-data deleting procedure for deleting, when present time measured by the first timing means is past the storage period end time for the content calculated in the storage-period-end-time calculating procedure, the content from the content-data storing means;

a second recording-time recording procedure for measuring time interpolated on the basis of the recording time when the recording of the content is executed in the content recording procedure, which is the time measured by the first timing means, and a difference between the time measured by the first timing means and a time set according to the operation by the operator and causing recording-time storing means, in which the recording time when the recording of the content is executed in the content recording procedure is stored, to store recording time measured by second timing means allowed to correct the time measured according to the operation by the operator;

a content-list generating procedure for generating, when a display request for causing display means to display recorded content stored in the content-data storing means is received, from the operator, a content list including data of all recorded contents and data of recording times of the contents from data of all contents read out from the content-data storing means and data of the recording time stored in recording-time storing means; and display control means for causing the display means to display the content list generated in the content-list generating procedure.

7. A computer-readable storage medium according to claim 6, wherein, in the storage-period extracting procedure, data of RETENTION BIT is detected from data of a PMT included in MPEG2-TS stored in the content-data storing means and data of a storage period of the content is extracted from the detected data of RETENTION BIT.

8. A content data managing apparatus comprising:
a first timing unit configured to measure time, the first timing unit being not allowed to correct time measured according to the operation by an operator;
a content-data storing unit configured to store data of content and recording time of the content measured by the first timing unit;
a content recording unit configured to record the content, to thereby cause the content-data storing unit to store data of the recorded content;
a first recording-time recording unit configured to cause the content-data storing unit to store, in association with the content, the recording time when the recording of the content is executed by the content recording unit, the recording time being measured by the first timing unit;
a storage-period extracting unit configured to extract, data concerning a storage period for the content from the data of the content stored in the content-data storing unit, the storage-period extracting unit detecting data of RETENTION BIT from data of a PMT included in MPEG2-TS stored in the content-data storing unit and extracts data of a storage period of the content from the detected data of RETENTION BIT;
a storage-period-end-time calculating unit configured to calculate storage period end time for the content from the storage period for the content extracted by the storage-period extracting unit and data of the recording time of the content; and
a content-data deleting unit configured to delete, when present time measured by the first, timing unit is past the storage period end time for the content calculated by the storage-period-end-time calculating unit, the content from the content-data storing unit.

9. A content data managing apparatus according to claim 8, further comprising:
a second timing unit for measuring time interpolated on the basis of the time measured by the first timing unit and a difference between the time measured by the first timing unit and the time set according to the operation by the operator, the second timing unit being allowed to correct the time measured according to the operation by the operator;
a recording-time storing unit for storing recording time when recording of the content is executed by the content recording unit;
a second recording-time recording unit for causing the recording-time storing unit to store the recording time when the recording of the content is executed by the content recording unit, the recording time being measured by the second timing unit;
a content-list generating unit for generating, when a display request for causing display means to display recorded content stored in the content-data storing unit is received from the operator, a content list including data of all recorded contents and data of recording times of the contents from data of all contents read out from the content-data storing unit and data of the recording time stored in recording-time storing unit; and
a display control unit for causing the display means to display the content list generated by the content-list generating unit.

10. A content data managing apparatus according to claim 3, wherein measuring time when the power supply to the apparatus is in the OFF state comprises:
detecting that the power supply is in an ON state; and
determining a time that elapsed between the OFF state and the detection of the ON state.

* * * * *